United States Patent [19]

Roberts

[11] Patent Number: 4,458,983

[45] Date of Patent: Jul. 10, 1984

[54] RESILIENT FERRULE CONNECTOR

[75] Inventor: Harold A. Roberts, North Attleboro, Mass.

[73] Assignee: Augat Inc., Mansfield, Mass.

[21] Appl. No.: 308,844

[22] Filed: Oct. 5, 1981

[51] Int. Cl.³ .............................................. G02B 7/26
[52] U.S. Cl. ............................. 350/96.20; 350/96.21
[58] Field of Search ................ 350/96.20, 96.21, 96.22

[56] References Cited

U.S. PATENT DOCUMENTS

| | | | |
|---|---|---|---|
| 3,999,837 | 12/1976 | Bowen et al. | 350/96.22 |
| 4,090,778 | 5/1978 | Phillips et al. | 350/96.20 |
| 4,127,319 | 11/1978 | Forney, Jr. et al. | 350/96.20 |
| 4,134,641 | 1/1979 | Kao et al. | 350/96.21 |
| 4,148,554 | 4/1979 | Magnusson et al. | 350/96.21 |
| 4,190,317 | 2/1980 | Makuch | 350/96.20 |
| 4,221,461 | 9/1980 | Bair | 350/96.20 |

FOREIGN PATENT DOCUMENTS

| | | | |
|---|---|---|---|
| 2821700 | 11/1978 | Fed. Rep. of Germany | 350/96.20 |
| 2910860 | 9/1980 | Fed. Rep. of Germany | 350/96.20 |

Primary Examiner—John D. Lee
Assistant Examiner—Frank González
Attorney, Agent, or Firm—Weingarten, Schurgin, Gagnebin & Hayes

[57] ABSTRACT

A resilient ferrule connector capable of terminating both tightly buffered and loosely buffered fiber optic cables without pot and polish steps and without damage to the fibers includes a hollow resilient ferrule with a tapered nose over which is forced a rigid cap having a concentrically precise frusto-conical interior taper. When the cap is forced onto the nose, the optical fiber extending through the nose is gripped and held concentric to the outer periphery of the cap thereby to facilitate coaxial alignment of the fiber with an opposing fiber when opposing ferrules are positioned within an alignment sleeve, the rigid cap providing inward radial pressure which prevents axial movement of the fiber relative to the ferrule when the ferrule is in an unmated condition. A method of recessing the end of the fiber within the nose of the ferrule which prevents dirt trapping includes the use of a flat-tipped tool for establishing the end of the fiber flush with the end of the nose. A cap with an undersized interior channel is then forced over the nose to cause the nose to bulge at its end thereby to provide for the recessing of the end of the fiber within the nose.

6 Claims, 8 Drawing Figures

RESILIENT FERRULE CONNECTOR

FIELD OF THE INVENTION

This invention relates to connectors for terminating optical fibers or fiber optic bundles without pot and polish techniques and more particularly to a connector for terminating a fiber without damage to the fiber.

BACKGROUND OF THE INVENTION

Optical fibers or fiber bundles have been terminated in ferrules to facilitate handling of the relatively delicate fibers so that they may be readily connected either to other fibers or to active devices such as light emitters or light detectors. In general, because the fibers or bundles vary in diameter, providing an adequate ferrule is difficult. The problem of the non-uniformity of the fiber diameter is accommodated in "rigid" ferrules by either tailoring the size of the aperture in the end of the ferrule to the fiber, or by adhesively attaching the end of the fiber to a slightly oversized aperture in the end of the ferrule. The adhesive attachment involves potting of the fiber and polishing its end which is time consuming and inconvenient. Providing an aperture tailored to a given fiber is impractical, and providing an oversized ferrule aperture can result in intolerable eccentricities of the fiber in the finished ferrule.

In order to accommodate fibers of varying diameter, "resilient" ferrule connectors have been utilized in which oversized apertures are used. Either the tip of the ferrule is made of resilient material with an oversized aperture through the tip, or a resilient conical insert having an oversized aperture is inserted in a solid outer ferrule. In the first case, the ferrule tip is compressed about a fiber passing through the tip by inserting the tip into an alignment sleeve or by providing a crimp shell around the tip. In the second case, the insert is pressed into the solid outer ferrule after fiber insertion, whereby the insert is compressed around the fiber.

More specifically, resilient ferrule connectors of the aforementioned insert type have been utilized in the past for loosely buffered cables, as exemplified by U.S. Pat. No. 4,190,317 in which a resilient insert is positioned within the nose of a ferrule and is forced rearwardly so as to compress about the fiber optic cable and retain it concentrically in the nose. It will be appreciated that in so doing, the optical fiber is pushed rearwardly with the insertion of the terminating insert. As a result this type of connector is not suitable for tightly buffered fiber optic cables since the fiber in this type of cable is not free to move rearward, and the fiber may be fractured when the insert is forced into the nose of the ferrule.

It should be noted that optical fibers are generally carried in cables, either in a loosely buffered or tightly buffered state. Tightly buffered cables are more difficult to terminate since they may break during the terminating process. For tightly buffered optical fibers the clad fiber is surrounded by a relatively thick coating which is in turn surrounded by a braided shield, usually of Kevlar, for tensile strength. The Kevlar shield is in turn surrounded by a cable jacket. In this manner a relatively rigid optical fiber is secured to the cable jacket and is tightly held thereby. On the other hand, loosely buffered cables include a loosely-held clad fiber which has a very thin coating, mainly utilized to prevent abrasion of the outer surface of the clad fiber. This fiber is carried loosely in a jacket with space between the fiber and the jacket. In general, the fiber is longer than the jacket and is coiled within the jacket to permit axial movement of the fiber relative to the jacket. It should be noted that while loosely buffered fiber optic cables are used generally in the communications field, tightly buffered cables are usually used for information transfer within computer networks.

There does exist a class of resilient ferrule connectors suitable for use with both loosely buffered and tightly buffered cables. As exemplified by U.S. Pat. No. 3,999,837, the connector utilizes a simple hollow resilient ferrule through which an optical fiber is passed. This resilient ferrule is merely inserted into an alignment sleeve which both compresses the ferrule around the optical fiber and aligns it to an opposing ferrule. However, with connectors of this type, the ferrule is not compressed onto the fiber unless mated in an alignment sleeve. Thus, in an unmated condition the ferrule does not securely grip the fiber. In general, this connector requires epoxy and a pot and polish operation in which a fiber with an epoxy coating is inserted into the ferrule and the ferrule is inserted into a sleeve until the epoxy hardens. After hardening, the fiber is cut off at the tip. The tip is then polished smooth. Not only are pot and polish operations inconvenient, failure of the epoxy can occur if the ferrule is unmated for any length of time.

As illustrated in U.S. Pat. No. 4,127,319 a resilient ferrule is terminated with a sleeve or shell which is crimped onto the nose portion of the ferrule. With the crimping on of the sleeve, the optical fiber is secured to the nose of the ferrule and is maintained loosely concentric to the finally crimped outer dimensions of the crimped shell or sleeve. It will however be appreciated that the utilization of a crimp sleeve can result in misalignments due to the variability in the outer dimensions of the crimp sleeve after having been crimped. While the crimp sleeve generally takes on the configuration of the crimping device, due to the deformable nature of the crimp shell itself the outer dimensions of the crimp shell can vary greatly. When a ferrule terminated in this manner is inserted into an alignment sleeve the variability in the outer dimension of the crimp shell affects the coaxiality or concentricity of the fiber vis a vis the alignment sleeve.

By way of further background, U.S. Pat. No. 4,090,778 describes the use of an oversized watch jewel at the tip of a rigid ferrule to facilitate accurate ferrule alignment in a sleeve, with the outer dimension of the watch jewel providing an accurate surface for the alignment of the ferrule within the alignment sleeve.

SUMMARY OF THE INVENTION

In the subject invention a resilient hollow ferrule is provided which has a tapered frusto-conical tip or nose. The optical fiber from the optical cable is positioned in the tip channel and a rigid cap having a concentrically precise frusto-conical interior channel which is smaller in diameter than the tip is pressed down over the tapered portion of the housing so as to compress the tip about the optical fiber. In so doing, the precisely concentric frusto-conical inner taper regularizes any non-uniformities in the outer dimension of the tip. By forcing the rigid cap over the tip, the optical fiber is located along the central axis of the ferrule and is concentric with the outer dimension of the cap. In general, the cap is of a non-resilient material such as metal and, in one embodiment, has a cylindrical outer configuration.

When the cap is pressed onto the tip the only relative movement of the elements of the ferrule are the cap relative to the tip. As a result, no axial forces are produced which could damage the rather fragile optical fiber and the system is thus well adapted for use with tightly buffered cables. Moreover, alignment of the ferrule vis a vis the alignment sleeve is exceedingly accurate due to the tight tolerance to which the outer dimension of the outer cap can be machined.

In one embodiment the end of an optical fiber is recessed within the tip through the utilization of a flat-tipped tool which is utilized to position the end of the optical fiber flush with the end of the nose or tip, and a cap with a considerably undersized interior channel is forced onto the nose which causes the end of the nose to bulge outwardly thereby providing a controlled small amount of spacing between the end of the nose and the end of the optical fiber contained therein. A major advantage to this method is that the bulge provides a continuous curve rather than sharp corners or edges at the end of the nose. Sharp corners can trap dirt when, for instance, a fiber is recessed into the nose by withdrawing the fiber into the nose. With the subject system, cleaning of the fiber end can be accomplished by merely wiping the end of the ferrule.

Thus not only is coaxial alignment achieved through the utilization of the precision rigid cap, but a method is provided for recessing the end of the optical fiber within the precision tip, such that when ferrules with these resilient tips are positioned within an alignment sleeve and are abutting, the optical fibers to be connected are appropriately spaced one from the other. This avoids damage to the ends of the fibers or excessive light loss through inappropriate end separation.

BRIEF DESCRIPTION OF THE DRAWINGS

These and other features of the subject invention will be better understood in connection with the detailed description taken in conjunction with the drawings of which.

DETAILED DESCRIPTION

Figure 1:
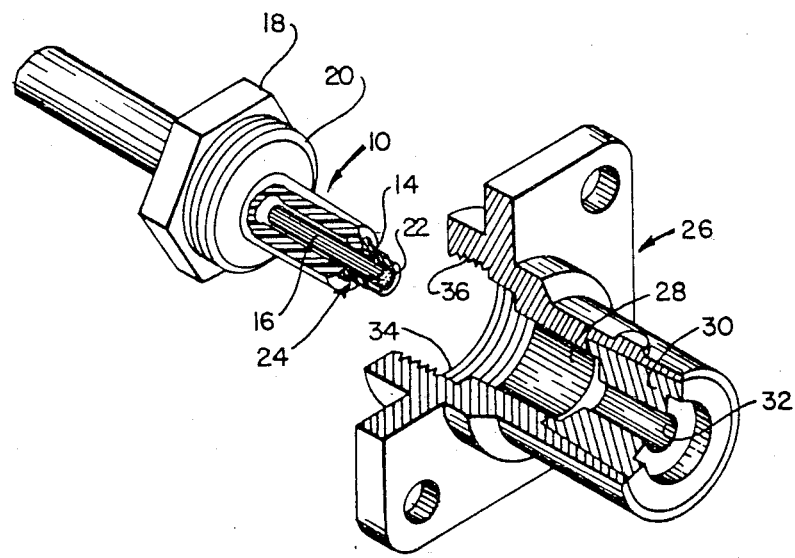
FIG. 1 is a cross-sectional and diagrammatic exploded view of a prior art connector in which a sleeve is crimped about the nose of a ferrule.

Referring to FIG. 1, a prior art resilient ferrule connecting system is illustrated in which a ferrule generally indicated at 10 has a nose portion 14 which is hollow and is adapted to receive an optical fiber bundle 16 therein. An integral nut 18 and a portion 20 having external threads are located at one end of the ferrule.

Optical fiber bundle 16 is captured within the nose 22 of ferrule 10 by virtue of the crimping of a metallic sleeve 24 about the nose of the ferrule. This is accomplished by a conventional crimping tool, such that when the sleeve is crimped onto the nose of the ferrule, the optical fiber bundle is secured and captured within the nose of the ferrule.

Ferrule 10 is adapted to be inserted into a receptacle 26 which has a central bore 28 and which has captured therein an alignment sleeve 30 having a bore 32. Bore 28 has an enlarged portion 34 which is internally threaded at 36 and is adapted to receive the external threads of ferrule portion 20 when the crimped portion of the ferrule is inserted into channel 32 of alignment sleeve 30. It will be appreciated that the concentricity of the optical fibers vis a vis the centerline of channel 32, is determined by the exterior dimension of the crimped sleeve 24. As mentioned hereinbefore, the outer configuration of a crimped member is variable regardless of the precision of the crimping tool due to the deformability of the sleeve. In short, because the sleeve is crimped, its outer dimension is not precise, which can effect the alignment of the optical fiber bundle vis a vis the centerline of alignment sleeve 32. Since alignment accuracy is a prerequisite to optimal light transmission between fibers joined by a fiber optic connector, any misalignment of the optical fiber with respect to the centerline of the alignment sleeve can result in substantial light loss through the connector. This is especially true with small optical fiber bundles or in the case of the joining of a single optical fiber with an opposed single optical fiber.

Figure 2A:
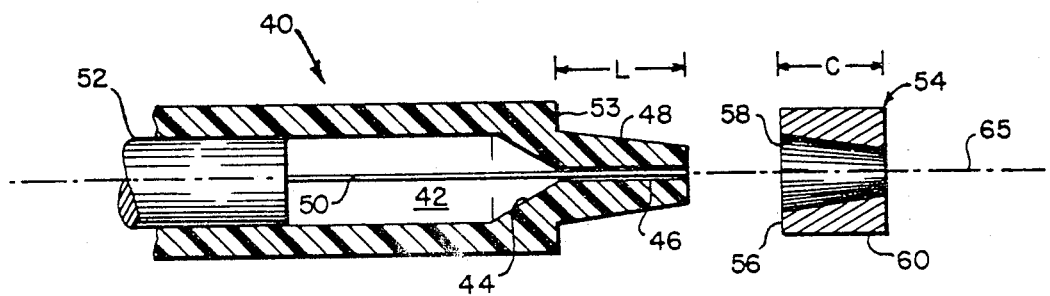
FIG. 2A is a cross-sectional illustration of the subject resilient ferrule, illustrating the utilization of a rigid cap which is forced over a nose portion of a resilient ferrule so as to capture an optical fiber or fiber bundle concentrically within the nose portion of the ferrule.
Figure 2B:
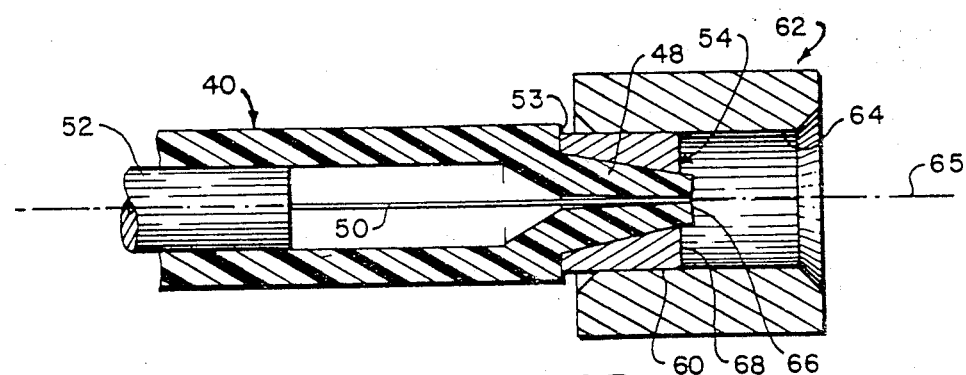
FIG. 2B is a cross-sectional illustration of the resilient ferrule of FIG. 2A in which the cap of FIG. 2A is forced over the nose portion, thereby to capture the optical fiber within the nose and to concentrically align it with respect to the centerline of an alignment sleeve.

Referring now to FIGS. 2A and 2B, in the subject system a resilient ferrule 40 is provided with a central channel 42 which is necked-down at 44 so as to provide a channel 46 which is concentric with the outer dimension of a tapered nose 48. In one embodiment, the configuration of nose 48 is conical and is made precise by machining or precision molding techniques, such that the centerline of channel 46 is coincident with the centerline of the symmetrically tapered outer surface of nose 48. As illustrated, an optical fiber 50 from a cable 52 is inserted into channel 46. Channel 46 is oversize with respect to the diameter of the optical fiber and thus, ferrule 40 may accommodate fiber optic cables having fiber cores of greatly differing diameters.

Ferrule 40 is provided with an annular shoulder 53 at the base or distal end of nose 48 which limits the travel of a rigid cap 54 when, as illustrated in FIG. 2B, the cap is forced onto nose 48 of ferrule 40, such that end 56 of the cap comes into contact with shoulder 53, thereby limiting the rearward travel of the cap in an axial direction. Cap 54 has a frusto-conical internal channel 58 which, in a preferred embodiment, has a taper matching that of the taper of nose 48, although of lesser diameter so as to be slightly undersized vis a vis the nose. Alternatively, there may be a substantial mismatch in the tapers, or the nose may be given a different symmetric tapered configuration. In any event, the internal channel 58 of cap 54 is precision ground so that when it is forced over nose 48, nose 48 has an outer surface which takes on the configuration of the tapered channel of the cap. Additionally, cap 54 has a precision machined outer surface 60. This machined outer surface is symmetric with respect to the centerline of the cap which, when forced over nose 48, is coincident with the centerline of channel 46.

Because the interior channel of the cap is slightly undersized, when cap 54 is forced on nose 48, as illustrated in FIG. 2B, nose 48 is compressed about fiber 50, such that fiber 50 is made to lie along centerline 65 by virtue of the precision mating surfaces of the cap and the nose. When cap 54 is inserted into an alignment sleeve 62, optical fiber 50 will be extremely accurately aligned with centerline 65, which is also the central axis of the alignment sleeve. Because of the coaction of the exterior dimension or surface 60 of cap 54 with the internal surface 64 of the alignment sleeve, fiber 50 is extremely accurately coaxially aligned with centerline 65 which forms a centerline for not only the alignment sleeve, but also the cap, the nose, and the fiber.

From inspection of FIGS. 2A and 2B, it will be appreciated that the forcing on of the cap over the nose results in a complete absence of any backwardly axial forces being applied to the fiber carried within the nose. This is because the only movement of a ferrule element with respect to another ferrule element is the cap with respect to the nose. Thus, the only force applied to the optical fiber is an inwardly directed force as the nose is compressed about the fiber.

It will be appreciated that due to the length "L" of nose 48 and the length "C" of cap 54, when cap 54 is forced onto the nose of the ferrule such that end 56 meets shoulder 53, there will be a portion of the nose 48, here illustrated at 66, which protrudes beyond surface 68 of cap 54. When a like opposing resilient ferrule is inserted into alignment sleeve 62, it is the abutting of the noses which provides for whatever spacing is required between the opposing fibers. Were the optical fibers of opposing ferrules not recessed within the noses of their respective ferrules, an undesirable spacing situation occurs in which intimate contact is made between the opposing fibers. It is generally recognized that the optimal spacing between opposing optical fibers is close to one core diameter and this optimal spacing is respectively provided in FIG. 3 by recessing the respective fibers in their respective ferrules, or in FIG. 4 by causing the noses of the opposing ferrules to bulge.

Figure 3:
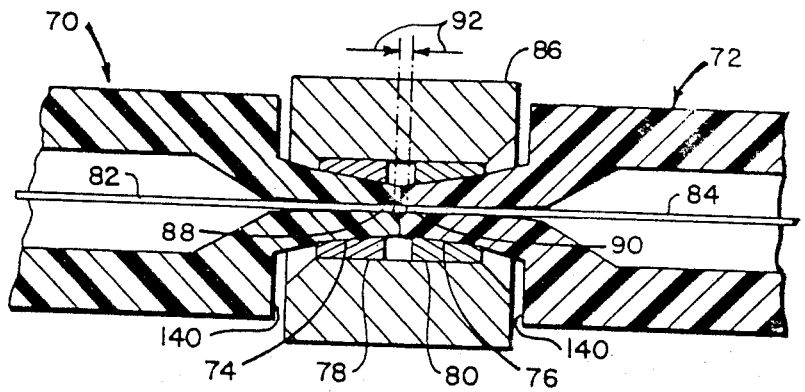
FIG. 3 is a cross-sectional illustration of opposed resilient ferrules having rigid caps thereon disposed within an alignment sleeve, in which the optical fibers captured within the noses of the ferrules are spaced apart by recessing the ends of the optical fibers within the respective noses of the ferrules.

Referring to FIG. 3, opposing resilient ferrules 70 and 72, having respective nose portions 74 and 76 provided with caps 78 and 80, have fibers 82 and 84 captured therein. These opposing ferrules are inserted into an alignment sleeve 86 with the ends 88 and 90 of fibers 82 and 84, being recessed within their respective nose portions by a distance indicated by arrows 92. As mentioned, the spacing between the fibers is optimally one core diameter and this is maintained through the mating and intimate contact of the noses of the opposed ferrules, with the optical fibers having been recessed within a ferrule nose during the termination process. One such prior art method of termination is described in connection with FIG. 5.

Figure 4:
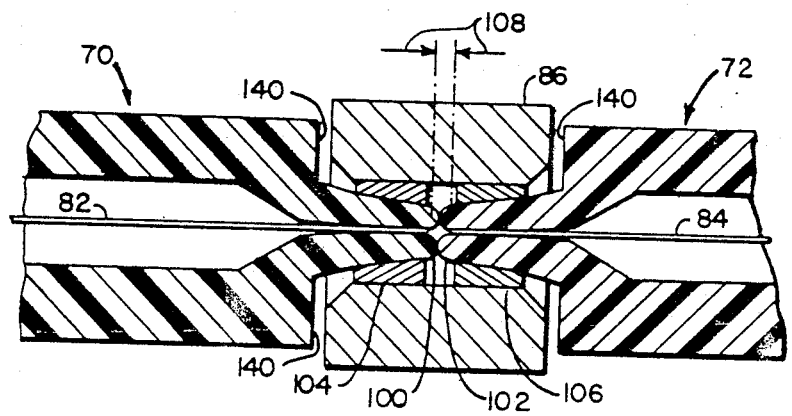
FIG. 4 is a cross-sectional illustration of opposed resilient ferrules located within an alignment sleeve in which rigid caps having undersized interior tapered channels are utilized to cause the noses of the ferrules to bulge outwardly, thereby to provide spacing between opposed optical fibers when the ferrules are inserted into an alignment sleeve and are abutting.

Referring to FIG. 4, ferrules 70 and 72 may be provided with bulging nose ends 100 and 102 through the utilization of caps 104 and 106 in which the caps have considerably undersized interior channels. In the example of FIG. 4, the spacing illustrated by arrows 108 is provided by the bulging of the ends of the ferrules so that when the bulging ends of respective opposing ferrules meet, fibers 82 and 84 contained therein are spaced apart by the appropriate amount. This method of termination is described in connection with FIGS. 6A and 6B.

Figure 5:
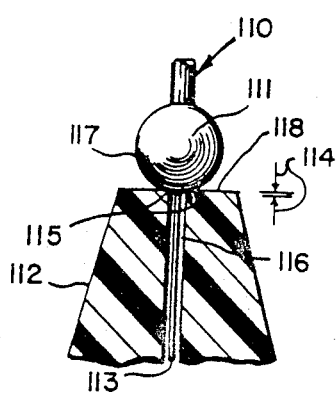
FIG. 5 is a diagrammatic illustration of a prior art system for fiber recessing involving the utilization of a rounded tool to recess a fiber within the tip of a resilient ferrule.

Referring now to FIG. 5, a prior art method of recessing an optical fiber within a nose portion 112 is provided by a tool 110 having a rounded end portion 111. Prior to the forcing on of the cap over nose portion 112, tool 110 is utilized to recess a fiber 113 within nose portion 112 by amount indicated by arrows 114. This is accomplished through the mating of the aperture walls 115 of the central channel 116 with the outer surface 117 of rounded end portion 111. Thereafter, the aforementioned cap is forced over the nose which captures the fiber within nose portion 112 at a distance indicated by arrows 114 from the end 118 of the nose.

Thus, the utilization of a round-tipped tool provides for the recessing of the fiber such that the spacing of opposed fibers as illustrated in FIG. 3 may be readily achieved. However, with this prior art method, dirt or other contaminants may be trapped in the recess due to the sharp edge discontinuity at the end of the central channel. Note that because of the sharp edge, dirt cannot be easily removed by wiping or chemical cleaning. Moreover, wiping may in fact introduce particles into the recess. In summary, this method of recessing results in a dirt trap.

Figure 6A:
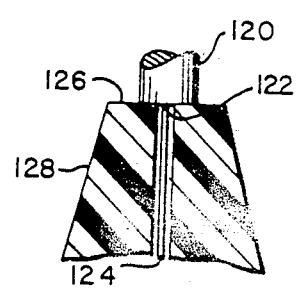
FIG. 6A is a diagrammatic illustration of the utilization of a flat-tipped tool to provide that a fiber end be flush with the nose of a resilient ferrule; and, FIG. 6B is a diagrammatic illustration of the result of utilizing a cap with an undersized interior channel when forced over the nose portion of the ferrule of FIG. 6A, thereby to provide a bulge in the end of the ferrule tip.
Figure 6B:
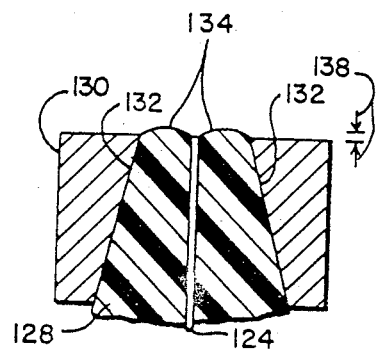

Referring to FIGS. 6A and 6B, the nose-bulging method of providing for the appropriate spacing results in an easily cleaned structure. In one embodiment, a flat-tipped tool 120 is utilized to position the end 122 of fiber 124 flush with end 126 of nose portion 128. Thereafter, as illustrated in FIG. 6B, a cap 130 is forced over nose portion 128, with the cap having an internal channel defined by walls 132 which is undersized with respect to the outer surface of the nose portion. When forced onto the nose in the manner described, the end 134 of the nose bulges as illustrated, thereby to recess fiber 124 a distance illustrated by arrows 138 from a plane defined by the bulging nose end. The bulging of nose portion 128 may be controlled by the configuration of the interior tapered channel in the cap vis a vis the dimension of the exterior surface of the nose portion. It will, however, be appreciated that in order to provide for the bulging nose portion, the cap surrounds the end of the nose as opposed to being allowed to be forced back so as to be spaced from the end of the nose.

Because of the continuous or rounded nature of the bulge, the end of the fiber may be cleaned by wiping. This is because there are no sharp discontinuities or edges at the end of the nose to trap dirt during the wiping process. Additionally, the rounded nose configuration does not act as a dirt trap during ordinary use.

Finally, it will be noted that in the FIGS. 3 and 4 embodiments, the cap need not be forced back to the shoulder 140 of the respective ferrule, although the shoulder can in fact provide a convenient stop and locating means for the cap.

In summary, a resilient ferrule connector capable of terminating both tightly buffered and loosely buffered fiber optic cables without pot and polish steps and without damage to the fibers includes a hollow resilient ferrule with a tapered nose over which is forced a rigid cap having a concentrically precise frusto-conical interior taper. When the cap is forced onto the nose, the optical fiber extending through the nose is gripped and held concentric to the outer periphery of the cap thereby to facilitate coaxial alignment of the fiber with an opposing fiber when opposing ferrules are positioned within an alignment sleeve, the rigid cap providing inward radial pressure which prevents axial movement of the fiber relative to the ferrule when the ferrule is in an unmated condition. A method of recessing the end of the fiber within the nose of the ferrule which prevents dirt trapping includes the use of a flat-tipped tool for establishing the end of the fiber flush with the end of the nose. A cap with an undersized interior channel is then forced over the nose to cause the nose to bulge at its end thereby to provide for the recessing of the end of the fiber within the nose.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for terminating optical fibers, comprising:
    an elongated ferrule having a nose portion of a resilient material said nose portion of a resilient material having an exterior surface having a distal end having a comparatively large first annular cross-section that tapers to a proximal end having a comparatively smaller second annular cross-section, said nose portion of a resilient material having a longitudinally extending central channel therethrough adapted to slidably receive an optical fiber therein; and
    a cap of a rigid material having an outer and an inner surface both symmetrical about a longitudinally extending cap centerline, said inner surface of said cap of a rigid material having a distal end having a comparatively large third annular cross-section that tapers to a proximal end having a comparatively smaller fourth annular cross-section, where the outside dimension of said first annular cross-section is larger than the dimension of said third annular cross-section and where the outside dimension of said second annular cross-section is larger than the dimension of said fourth annular cross-section, wherein said optical fiber is inserted in said longitudinally extending central channel and said cap of rigid material is forced over said nose portion of a resilient material, said cap uniformly radially compresses said nose portion into tight-fitting frictional engagement with said fiber, with said longitudinally extending centerline of said cap coaxial with said longitudinally extending central channel of said nose portion.

2. The apparatus of claim 1 wherein said ferrule has an annular shoulder disposed at the distal end of said nose portion to limit the travel of said cap.

3. The invention of claim 1, further including an alignment sleeve having a central bore having an interior surface adapted to slidably receive the exterior surface of said cap of rigid material.

4. A method of terminating an optical fiber comprising the steps of:
    loosely confining the fiber in a central longitudinally extending channel formed in a ferrule having a conically tapered nose portion fashioned from a resilient material; and
    slidably mounting a cap of a rigid material having a conically tapered interior channel complimentary to and slightly smaller than the conically tapered nose portion to uniformly radially collapse the resilient material of the nose onto the fiber in a tight-fitting frictional engagement therewith.

5. The method of claim 4 wherein the rigid cap has an outer dimension symmetric about the centerline of the cap and wherein the tapered interior channel is also symmetric about the centerline of the cap.

6. A method of recessing the ends of optical fibers carried in ferrules having resilient nose portions having a channel that are inserted in an alignment sleeve comprising the steps of:
    positioning the fiber in the channel within the nose portion with its end flush with the end of the nose portion; and
    forcing a cap of rigid material with an undersized interior taper over the nose portion causing uniform radial compression of the material of the end of the nose portion about the channel with the end of the channel bulging outwardly beyond the end of the optical fiber.

* * * * *